June 13, 1967 W. A. DILL 3,324,878
FLOAT VALVE
Filed May 4, 1964 2 Sheets-Sheet 1
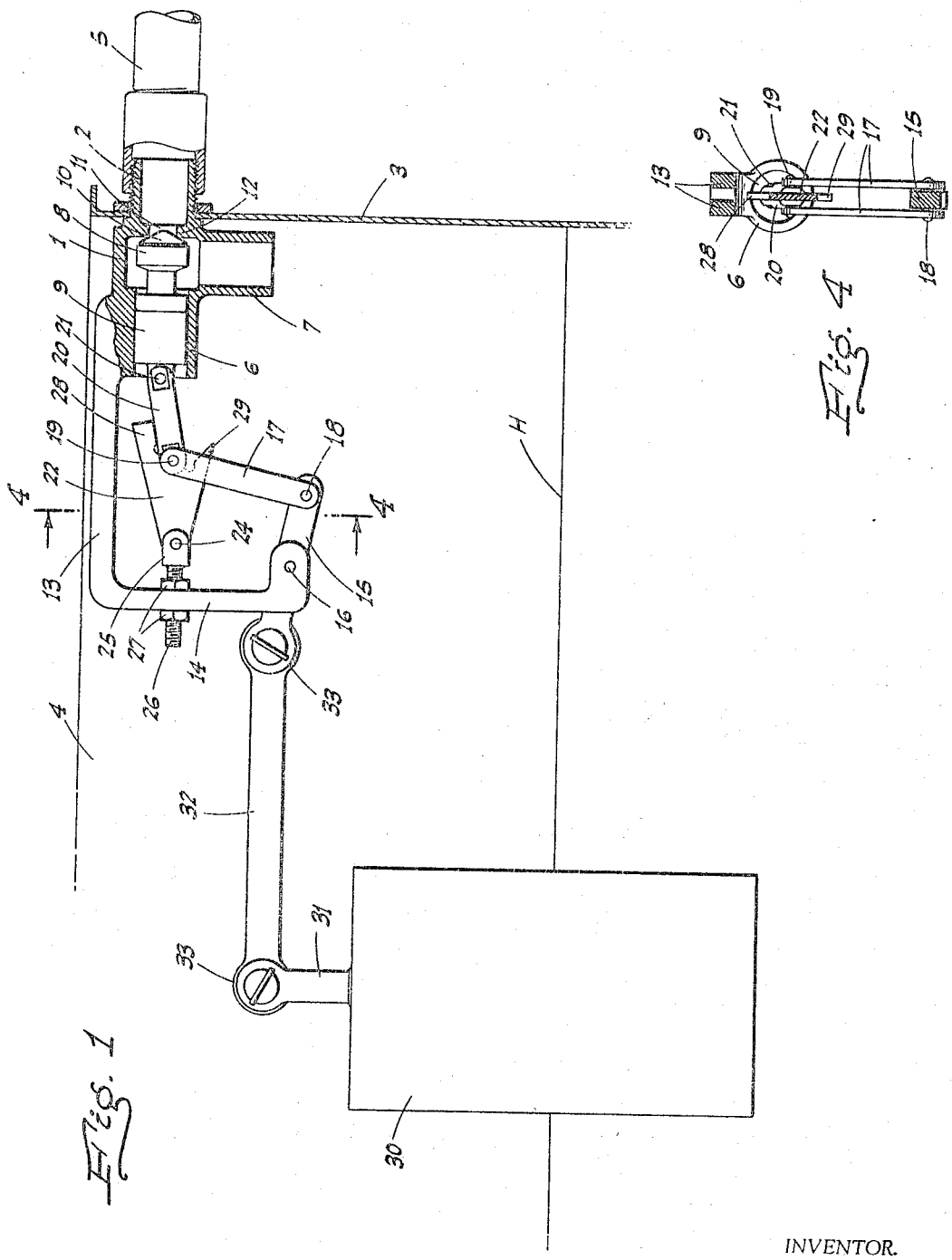

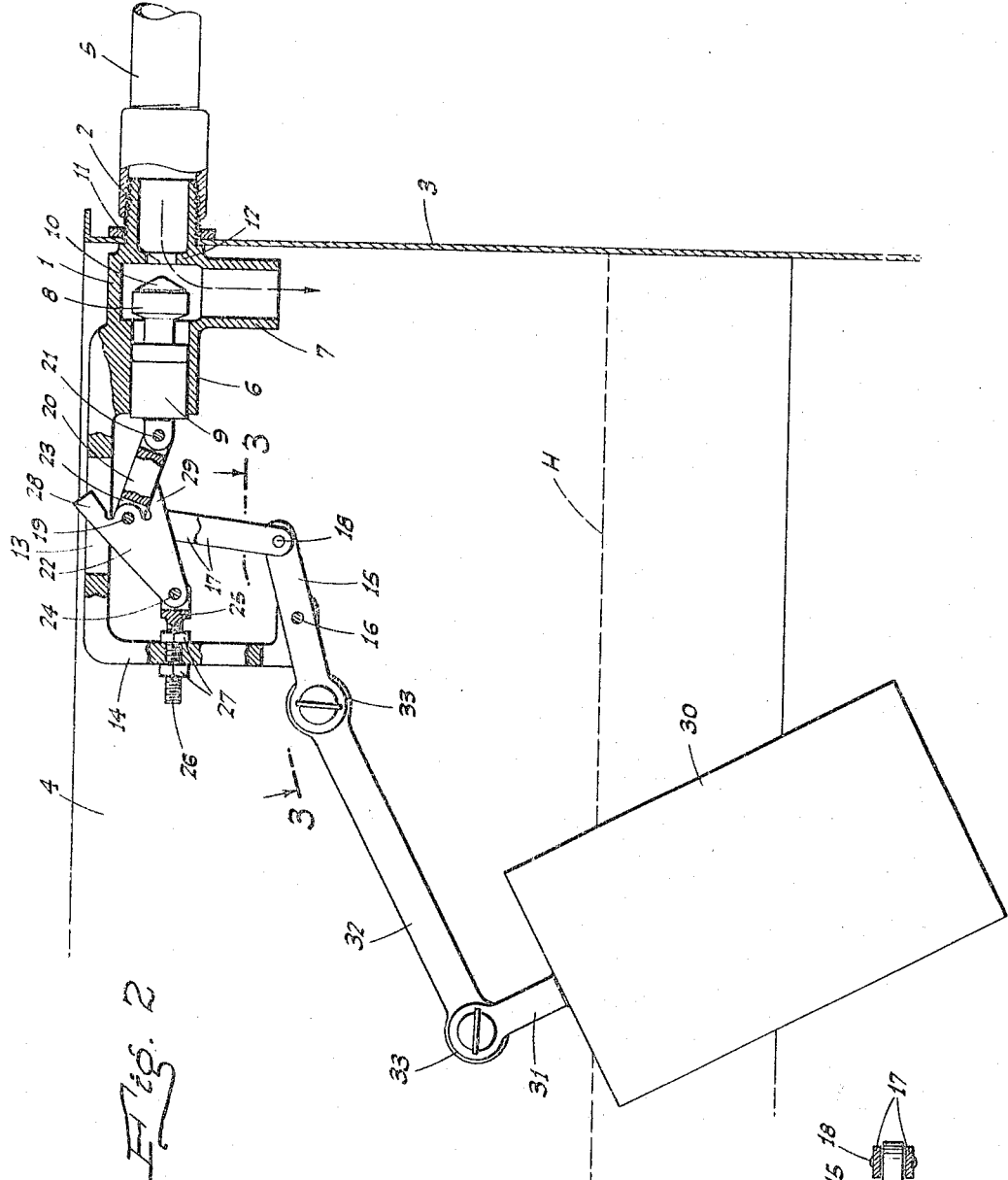
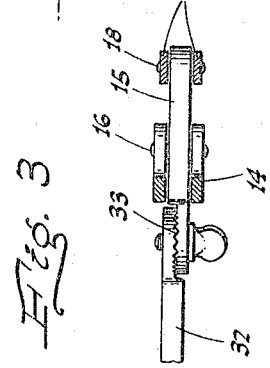

United States Patent Office 3,324,878
Patented June 13, 1967

3,324,878
FLOAT VALVE
Walter A. Dill, 8343 Balboa Ave.,
Stockton, Calif. 95207
Filed May 4, 1964, Ser. No. 364,411
7 Claims. (Cl. 137—413)

This invention relates to float controlled valves (or float valves as they are commonly known) which are used to control the flow of water under pressure from a supply pipe into a tank or other receptacle and from which water may be periodically drawn.

As such valves are usually constructed, the float action is such that the valve is only gradually opened or closed as the level of the water in the tank is lowered or raised, respectively, and which condition prevails during the full vertical movement of the water in the tank below a predetermined high level. This operative feature not only slows down refilling of the tank, but has a tendency to increase the wear on the valve due to the relatively long continued flow of water—under pressure from the source—past the valve.

It is, therefore, the major object of my invention to avoid the above objectionable feature of conventional float valves by providing a valve and a float controlled mechanism for operating the same so constructed that the water will pass through the valve in a completely unrestricted manner; i.e., with the valve wide open until the water reaches a predetermined high level in the tank or other receptacle into which the water is flowing. At such predetermined high level, the valve is immediately quick-closed by the float action. Similarly, upon withdrawal of water from the tank, the valve remains fully closed until the water reaches a predetermined low level. At such predetermined low level the valve is immediately quick-opened by the float action.

A further object of the invention is to provide a valve and its float controlled mechanism constructed in a manner whereby the desired result is attained without the use of any auxiliary springs, floats, counterweights, or the like, and so that the manufacturing cost of the device may be competitive with existing or conventional float valves.

A further object of the invention is to provide a float valve which is designed for ease of manufacture, and ready installation.

A still further object of the invention is to provide a practical, reliable, and durable float valve and one which is exceedingly effective for the purpose for which it is designed.

These objects are accomplished by means of such structure and relative arrangement of parts as will fully appear by a perusal of the following specification and claims.

In the drawings:

FIG. 1 is a longitudinal elevation of the improved float valve in closed position; certain parts being broken out and in section.

FIG. 2 is a similar view, but showing the float valve in open position.

FIG. 3 is a fragmentary sectional plan taken on line 3—3 of FIG. 2.

FIG. 4 is a fragmentary transverse section taken on line 4—4 of FIG. 1.

Referring now more particularly to the drawings and to the characters of reference marked thereon, the valve comprises a T-shaped body 1 having a threaded lateral neck 2 which projects through and is secured to a wall 3 of the tank 4 into which the valve discharges; said neck 2 being secured to the water supply pipe 5. A lateral cylinder 6 is formed on the body 1 in opposed relation to neck 2, while a discharge passage 7 depends from the body 1 between the end portions 2 and 6 thereof.

The valve element 8 is formed with a rearwardly projecting guide plunger 9 slidable in the cylinder 6; said valve element 8 projecting toward the neck 2 and terminating in a cone shaped nose 10—of rubber or similar material—adapted to engage in sealing relation with a seat 11 formed in a wall 12 in the valve body 1.

As thus constructed and mounted, the valve body 1 disposes the guide plunger 9 in a horizontal position in which said plunger faces into the tank 4 in a direction away from wall 3 thereof.

The back and forth movement of the plunger 9, as required to open and close the valve, is effected by means of the following float controlled mechanism: Rigid with the body 1 and extending lengthwise and rearwardly therefrom and above the same is a bracket 13. Such bracket 13 projects into the tank 4 some distance and at its free end includes a depending leg 14, the lower end of which is disposed some distance below the axial plane of the guide plunger 9.

A rocking arm 15—disposed some distance below and lengthwise of the bracket 13—is pivoted intermediate its ends on the leg 14 at its lower end, as at 16. Upstanding links 17 straddle the rocking arm 15 at its forward end, and at their lower ends the links are pivoted on said arm, as at 18. At their upper ends, the links 17 are connected by a pin 19 which also pivotally connects said links with the rear end of a relatively wide and substantially horizontal link 20. Link 20—in turn—is pivoted at its forward end, as at 21, to the rear end of the plunger 9.

The pin 19 also serves as the pivotal connection for a longitudinal link or stop plate 22 at the forward end thereof; said end projecting into a slot 23 formed in the adjacent end of the link 20 and across which slot the pin 19 extends. The link 20 and stop plate 22 together form— in effect—a toggle unit.

At its opposite or rear end, the stop plate 22 is pivoted, as at 24, in a clevis 25 provided with a rearwardly extending threaded stem 26. Such stem projects through the leg 14 and is secured thereto, for longitudinal adjustment, by nuts 27 engaging opposite sides of said leg.

At is forward end, the stop plate 22 is formed with forwardly projecting upper and lower stop fingers 28 and 29, respectively. These stop fingers are spaced apart vertically a predetermined distance, and extend forwardly beyond the link slot 23. The upper finger 28 engages the upper surface of link 20 when the valve is closed, as in FIG. 1, and the lower finger engages the lower surface of said link when the valve 8 is open, as in FIG. 2.

The stop plate 22 is swung down or up, to close or open the valve, respectively, and as determined by the depth of the water in the tank, by reason of corresponding vertical movement of the links 17 induced in the manner yet to be described.

When the valve, as in FIG. 2, is open, the guide plunger 9 is retracted; the link 20 then extending rearwardly and upwardly to the pin 19, while the stop plate 22 extends rearwardly and downwardly from said pin 19 to the fixed rear-end pivot 24. In other words, the toggle unit formed by link 20 and stop plate 22 is broken upwardly.

A float 30 has a central stem 31 extending upwardly therefrom; such stem being connected at its upper end to the rear end of a forwardly projecting arm 32 and—in turn—the forward end of arm 32 is connected to the rear end of rocking arm 15. The connections employed are of conventional and adjustable serrated disc type; each such connection being indicated at 33. The arms 15 and 32 together form a rigid but adjustable arm unit; the connections 33 permitting of the adjustment of the connected parts relative to each other.

The float 30 is of special form in that—while the cross sectional shape of the float is not particularly important—it is essential that the bottom thereof be flat as shown and disposed in a plane at right angles to the longitudinal plane of the stem 31, and that the sides of the float shall be straight and parallel to each other. Also, the stem and float should be in a vertical position when the valve is closed, as shown in FIG. 1.

When the water in the tank 4 is at a predetermined high level H, the float 30 will have been lifted and, by reason of the rigid arm unit 15–32, the links 17 will have been pulled down from their raised position. With such downward movement of the links 17, the link 20 and plate 22 are in effect straightened out relative to each other, causing the guide plunger 9 to be advanced in the body 1 and the valve nose 10 to be engaged with the seat 11 in sealing relation. When the nose 10 has a tight fit with the seat 11, the stop plate 22 will have been swung down sufficiently about its rear pivot 24 to cause the upper stop finger 28 on said plate to press down on the link 20 to thus prevent any further downward movement of the pin 19 and parts connected thereto. When such engagement of the upper stop finger 28 with the link 20 takes place, said link and the plate 22 will have been pulled down slightly below a dead-center position of the pivot 19 relative to the opposed end pivots 21 and 24 of said link and plate, respectively. The valve is thus locked against being opened by water pressure within the valve body, and—as nose 10 is of yieldable or resilient material—such locking can be attained without there being any loose-play in the various link pivots.

It will be noted that the adjustability of the stem 26 of the stop plate 22 serves to control the fully advanced or retracted position of the valve element 8 and the nose 10 relative to the seat 11, as the condition of such nose— due to wear or loss of its inherent live nature—may necessitate.

With the described arrangement, the valve will remain closed, as the level of the water in the tank is lowered by the withdrawal of water therefrom, until the float—in its raised position—is sufficiently unsupported by the water that its weight becomes effective to swing arm unit 15–32 in a direction to thrust upwardly on the links 17 with enough force to upwardly break the under-dead-center lock of the link 20 and stop plate 22. This also causes the link 20 to be swung upwardly and the plunger 9 to be pulled back, and the valve quick-opened to the position shown in FIG. 2. The lower stop finger 29 on the plate 22 then engages the under side of the link 20 and prevents the valve from being opened any further.

The valve will remain in this open position until the water as it enters the tank finally counteracts the weight of the float and the buoyancy thereof causes the same to be lifted which results in reverse of the action described in the preceding paragraph, and quick-closing of the valve to the position shown in FIG. 1; the water then at its original high level H.

To attain the above results, it is necessary that the total height of the float shall be greater than the total vertical movement of the arm unit 15–32 at its rear end, or at its point of connection 33 with the float stem 31. This is for the reason that there must be some residual buoyancy remaining in the float at the highest point of movement thereof—and when the water is at a high level—in order to pull the link 20 and plate 22 downward to an under-dead-center position to lock the valve closed. It is also requisite that the shape of the float shall be such that when the float is in a vertical position, which is when the valve is closed or is about to be closed, the ratio of the buoyancy force to the length of the then submerged portion of the float will be equal to or greater than 1.0.

On the other hand, when the water is at a low level, the arm unit 15–32 has been swung down at its rear end from the generally horizontal position occupied thereby when the valve is closed, and is then disposed with its greatest length below a horizontal plane. The float 30 is then also disposed at an angle to a vertical plane, being fixed with the arm 32 at substantially 90 degrees thereto.

As the water level begins to rise, the total buoyancy force exerted by the float is partly tangential to and partly parallel to the arm 32. These relatively opposed force components substantially counteract each other until, as the water rises and approaches the high level, the tangential component of said buoyancy force becomes sufficiently great to lift the float and cause the valve to be quick-closed as hereinbefore described.

From the foregoing description, it will be readily seen that there has been produced such a float valve as substantially fulfills the objects of the invention, as set forth herein.

While this specification sets forth in detail the present and preferred construction of the float valve, still in practice such deviations from such detail may be resorted to as do not form a departure from the spirit of the invention, as defined by the appended claims.

Having thus described the invention, the following is claimed as new and useful and upon which Letters Patent is desired:

1. A float valve structure comprising, with a fixed valve body having an inlet adapted for connection to a source of liquid under pressure, a discharge passage which delivers into a receptacle on which the body is mounted, a valve seat in the body between the inlet and discharge passage, and a valve element slidable in the body to cooperate with the seat in valve opening and closing relation; means mounting the body on the receptacle so that the valve element projects rearwardly in the receptacle and is disposed in a substantially horizontal plane, a bracket rigid with and projecting rearwardly from the body, a toggle link unit comprising a pair of links extending between the rear end of the valve element and the bracket, said links being pivotally connected to each other at their adjacent ends and at their opposite ends to said element and the bracket, said toggle link unit when straightened lying in a substantially horizontal plane and advancing the valve element to closed position and when buckled retracting the valve element to open position, a float to engage the liquid in the receptacle, and means connecting the float and toggle link unit to straighten such toggle link unit upon the float reaching a predetermined high position, and to buckle said toggle link unit upon the float reaching a predetermined low position; the float being elongated in an upstanding direction and formed with straight parallel sides and a flat bottom, the sides lying in a substantially vertical plane when the valve is closed and the liquid is at a corresponding predetermined high level, and the ratio of the buoyancy force of the float to the length of the then submerged portion of the float is then substantially equal to 1.0.

2. A valve structure, as in claim 1, in which the connecting means includes a rigid elongated arm unit rigidly connected at its rear end to the float at the top and pivoted on the bracket at a point relatively close to the forward end of said arm unit, and a substantially vertical link connected to the forward end of the arm unit and to the toggle link unit intermediate the ends thereof.

3. A valve structure, as in claim 1, in which the connecting means includes a rigid elongated arm unit rigidly connected at its rear end to the float at the top and pivoted on the bracket at a point relatively close to the forward end of said arm unit; the latter comprising front and rear sections, means adjustably clamping the arm sections together at their adjacent ends, and means adjustably clamping the rear section at its rear end to the float to alter the angle therebetween.

4. A float valve structure comprising, with a fixed valve body having an inlet adapted for connection to a source of liquid under pressure, a discharge passage which delivers into a receptacle on which the body is mounted, a valve seat in the body between the inlet and discharge passage, and a valve element slidable in the body to cooperate with the seat in valve opening and closing relation; means mounting the body on the receptacle so that the valve element projects rearwardly in the receptacle and is disposed in a substantially horizontal plane, a bracket rigid with and projecting rearwardly from the body, a toggle link unit comprising a pair of links extending between the rear end of the valve element and the bracket, said links being pivotally connected to each other at their adjacent ends and at their opposite ends to said element and the bracket, said toggle link unit when straightened lying in a substantially horizontal plane and advancing the valve element to closed position and when buckled retracting the valve element to open position, a float to engage the liquid in the receptacle, a rigid elongated arm unit rigidly connected to the float and projecting lengthwise to a forward termination below the toggle link unit, means pivoting the arm unit adjacent but short of its forward end on the bracket, and an upstanding link pivotally connecting the forward end of the arm unit with the toggle link unit at the adjacent ends of the links; upward movement of the float causing the arm unit to pull the toggle link unit to its straightened position to close the valve, and downward movement of the float causing the arm unit to buckle the toggle link unit to open the valve.

5. A structure, as in claim 4, in which the float has a flat bottom surface and the sides of the float are parallel to each other; the arm unit being connected to the top of the float.

6. A structure, as in claim 5, in which the float is vertically disposed when the valve is closed; the arm unit being then disposed in a substantially horizontal plane.

7. A structure, as in claim 4, in which the arm unit is connected at the rear end to the float for adjustment about a horizontal transverse axis, and said arm unit comprises a forward section and a rear section; there being means pivotally connecting the sections together at adjacent ends for adjustment about a horizontal transverse axis.

References Cited

UNITED STATES PATENTS

| 909,409 | 1/1909 | Herschler | 137—445 X |
| 1,382,027 | 6/1921 | Sweeny | 137—420 |
| 1,788,251 | 1/1931 | Rosenow | 137—448 |

FOREIGN PATENTS 742,391  12/1955  Great Britain.

WILLIAM F. O'DEA, *Primary Examiner.*

D. R. MATTHEWS, *Assistant Examiner.*